US008259686B2

(12) United States Patent
Kanto et al.

(10) Patent No.: US 8,259,686 B2
(45) Date of Patent: Sep. 4, 2012

(54) ARRAY ANTENNA SYSTEM AND TRANSMIT/RECEIVE MODULE THEREOF

(75) Inventors: Kazuhiro Kanto, Kanagawa-ken (JP); Haruo Kojima, Kanagawa-ken (JP); Tooru Tanaka, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 577 days.

(21) Appl. No.: 12/323,837

(22) Filed: Nov. 26, 2008

(65) Prior Publication Data

US 2009/0156138 A1 Jun. 18, 2009

(30) Foreign Application Priority Data

Dec. 18, 2007 (JP) ................................ 2007-326183

(51) Int. Cl.
*H04W 4/00* (2009.01)

(52) U.S. Cl. ...................... 370/334; 375/304; 455/562.1

(58) Field of Classification Search .......... 370/334–335, 370/339, 516–518; 375/304, 315; 455/83, 455/107, 562.1; 342/367–368, 374
See application file for complete search history.

(56) References Cited

U.S. PATENT DOCUMENTS

| | | | | |
|---|---|---|---|---|
| 3,978,482 | A | 8/1976 | Williams et al. | |
| 4,658,257 | A * | 4/1987 | Izutani et al. | 342/372 |
| 5,061,937 | A | 10/1991 | Ozeki et al. | |
| 5,894,598 | A * | 4/1999 | Shoki | 455/562.1 |
| 6,215,443 | B1 * | 4/2001 | Komatsu et al. | 343/700 MS |
| 7,181,162 | B2 * | 2/2007 | Chang et al. | 455/13.1 |
| 7,433,339 | B2 * | 10/2008 | Kaipainen et al. | 370/335 |
| 7,450,066 | B2 * | 11/2008 | Haskell | 342/368 |
| 7,668,514 | B2 * | 2/2010 | Ojo et al. | 455/73 |
| 7,738,356 | B2 * | 6/2010 | Kim | 370/208 |
| 2003/0022395 | A1 * | 1/2003 | Olds | 438/3 |
| 2004/0048634 | A1 * | 3/2004 | Satoh et al. | 455/562.1 |
| 2004/0085933 | A1 * | 5/2004 | Wang | 370/334 |
| 2005/0220195 | A1 * | 10/2005 | Shimizu | 375/257 |
| 2006/0061417 | A1 * | 3/2006 | Ohnishi et al. | 330/51 |
| 2006/0079290 | A1 * | 4/2006 | Seto et al. | 455/562.1 |
| 2007/0116105 | A1 | 5/2007 | Tero et al. | |
| 2007/0243833 | A1 * | 10/2007 | Nakatani et al. | 455/78 |
| 2009/0180446 | A9 * | 7/2009 | Kent et al. | 370/334 |

FOREIGN PATENT DOCUMENTS

| | | |
|---|---|---|
| JP | 45-9357 | 4/1970 |
| JP | 1-129509 | 5/1989 |
| JP | 5-27007 | 2/1993 |
| JP | 6-53726 | 2/1994 |
| JP | 2006-180218 | 7/2006 |

OTHER PUBLICATIONS

Yasumitsu et al., Active Array Antenna, Feb. 5, 1993, Japanese Patent Publication No. JP05-027007, pp. 1-22.*

* cited by examiner

*Primary Examiner* — Chi H. Pham
*Assistant Examiner* — Kevin Mew
(74) *Attorney, Agent, or Firm* — Oblon, Spivak, McClelland, Maier & Neustadt, L.L.P.

(57) ABSTRACT

There is provided one exemplary array antenna system having a plurality of arrayed element antennas and transmit/receive modules that are respectively connected with those element antennas and that apply a predetermined phase shift amount to transmitting signals to be supplied to the element antennas and to received signals received by the element antennas, wherein the transmit/receive module has one transmitting path that is connected to first and second element antennas and that amplifies and distributes the transmitting signal to the first and second element antennas after applying a predetermined transmitting phase shift amount and two receiving paths that amplify and apply respectively a receiving phase shift amount to the received signals received from the first and second element antennas.

12 Claims, 4 Drawing Sheets

ARRAY ANTENNA SYSTEM AND TRANSMIT/RECEIVE MODULE THEREOF

CROSS-REFERENCE TO THE INVENTION

This application claims the foreign priority benefit of Japanese Patent Application No. 2007-326183, filed on Dec. 18, 2007 in the Japan Patent Office, the disclosure of which is herein incorporated by reference in its entirety.

BACKGROUND OF THE INVENTION

1. Field of the Invention

The present invention relates to an array antenna system and a transmit/receive module thereof for use as a radar apparatus and the like.

2. Description of the Related Art

An electronic scan-type array antenna system that has a plurality of two-dimensionally arrayed element antennas and that scans by changing a transmitting directivity of pulse signals transmitted from those element antennas and a receiving directivity of their reflected waves by way of phase control has been used as a radar apparatus and the like.

Among such array antenna system, there has been known an antenna system in which components that are connected to each element antenna and that perform the phase control of the transmitting/receiving signals are combined as a transmitting/receiving unit. A unitary unit is formed by units having transmitting and receiving paths connected to one element antenna through a circulator.

The unitary unit described above may be brought together with a plurality of element antennas and FIG. 1 shows a prior art exemplary structure in which a transmitting/receiving unit is formed by combining two unitary units for example.

Each of a plurality of, e.g., five, transmit/receive modules 31 is connected with element antennas 32*a* and 32*b* in the array antenna system 30.

The transmit/receive module 31 is composed of two unitary units 31*a* and 31*b* having the same structure from each other. The unitary unit 31*a* has a three-terminal circulator 41*a* having terminals A, B and C, a receiving amplifier 42*a*, a receiving phase shifter 43*a*, a transmitting phase shifter 44*a* and a transmitting amplifier 45*a*. A transmitting signal sent from a transmitting signal generating section 34 is distributed by a transmitting signal distributing section 33. Then, the transmitting phase shifter 44*a* applies a phase shift amount controlled by a transmitting/receiving phase control section 38 to the transmitting signal and the transmitting amplifier 45*a* amplifies it. The signal is then input to the three-terminal circulator 41*a* and is transmitted from the element antenna 32*a*.

Reflected waves enter the element antenna 32*a* and after passing through the three-terminal circulator 41*a*, the receiving amplifier 42*a* and the receiving phase shifter 43*a*, are synthesized by a received signal synthesizing section 35. A received signal processing section 36 electrically conducts image processing on the synthesized signal and an image displaying section 37 displays a radar image. The same applies also to the unitary unit 31*b*.

This prior art array antenna system 30 has had a problem that it requires the transmission phase shifters 44*a* and 44*b* and the transmission amplifiers 45*a* and 45*b* because it has the receiving and transmitting paths per each of the unitary units 31*a* and 31*b*.

It is conceivable to form one of the unitary units, e.g., the unitary unit 31*b*, close to the both ends of the apparatus to have only the receiving path in order to reduce the transmission phase shifters 44*a* and 44*b* and the transmitting amplifiers 45*a* and 45*b*. However, if the antenna system is constructed as such, there have been problems that an apparent size as an antenna becomes small and an antenna gain drops, degrading in performance as an antenna system.

There has been also known an array antenna system having a transmit/receive module having a distributing synthesizer as disclosed in Japanese Patent Disclosure TOKUKAI No. Hei. 6-53726 for example (see FIG. 4 in particular). However, this is an antenna system having a pair of cross dipole antennas for polarized waves in X and Y directions and its purpose, construction and advantages are different from those of the present invention.

SUMMARY OF THE INVENTION

In view of the problems of the prior art array antenna system as described above, the present invention seeks to provide an array antenna system and its transmit/receive module whose cost may be reduced as a whole by reducing circuits of a transmitting path without dropping a transmitting antenna gain.

According to one aspect of the invention, there is provided an array antenna system having a plurality of arrayed element antennas and transmit/receive modules that are respectively connected with those element antennas and that respectively apply a predetermined phase shift amount to transmitting signals to be supplied to the element antennas and to received signals received by the element antennas, wherein the transmit/receive module has one transmitting path that is connected to the first and second element antennas and that amplifies and distributes the transmitting signal to the first and second element antennas after applying a predetermined transmitting phase shift amount and two receiving paths that respectively amplify and apply a receiving phase shift amount to the received signals received from the first and second element antennas.

According to other aspect of the invention, there is provided an array antenna system and its transmit/receive module whose circuits of the transmitting path may be cut and whose cost may be lowered as a whole without lowering a transmitting antenna gain.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory and are not restrictive of the invention, as claimed.

DETAILED DESCRIPTION OF THE INVENTION

Figure 1:
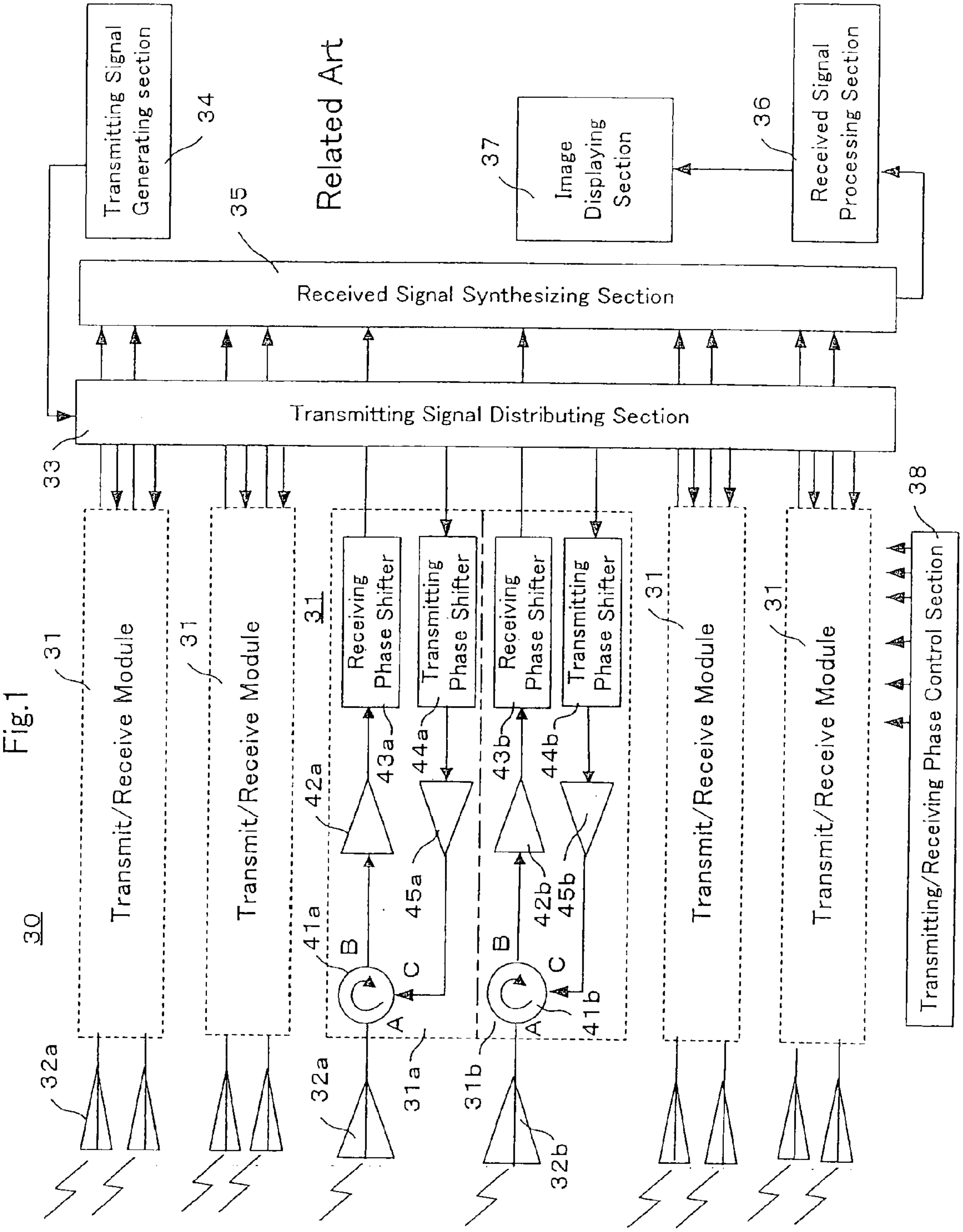
FIG. 1 is a block diagram showing one exemplary structure of a prior art array antenna system.
Figure 2:
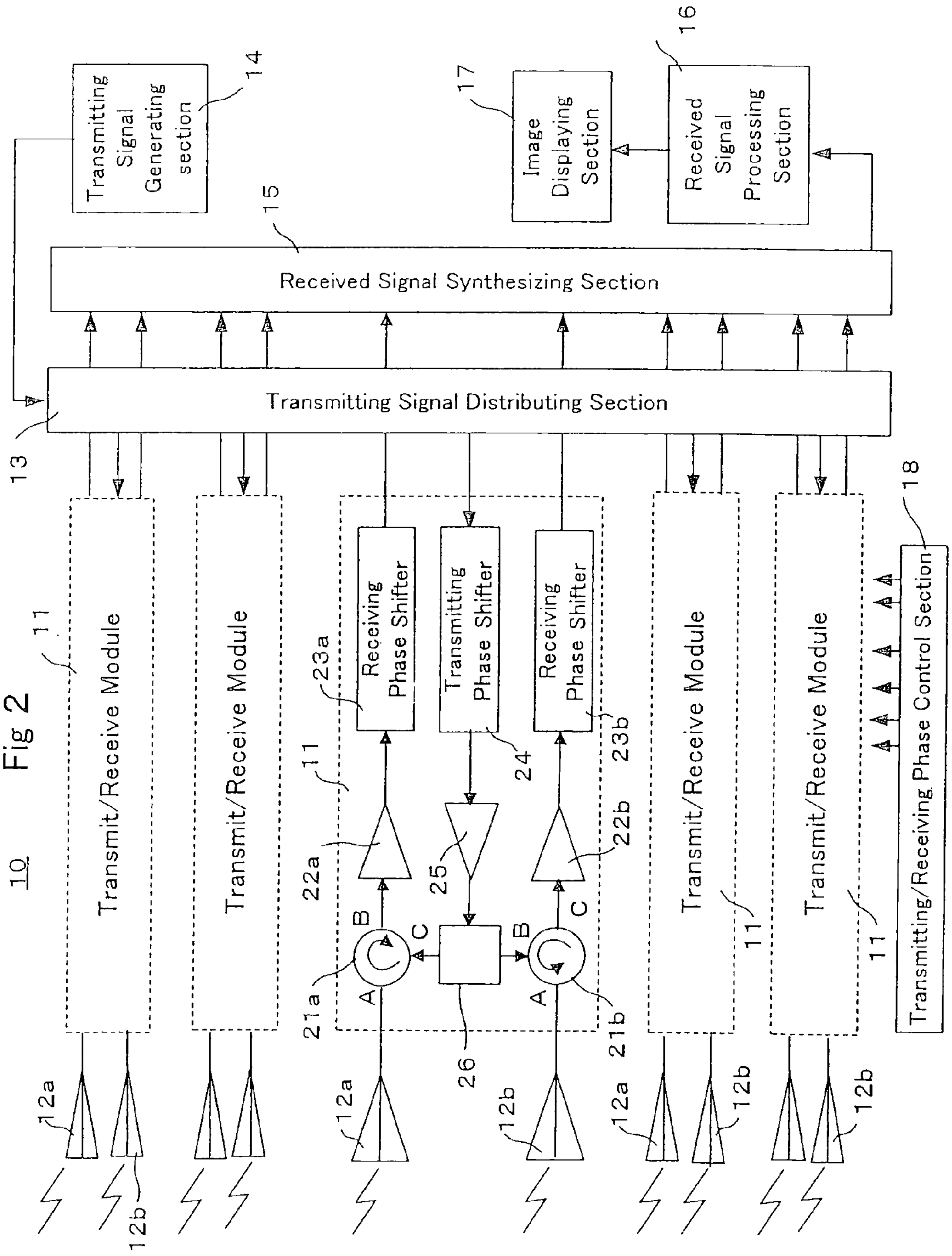
FIG. 2 is a block diagram showing a structure of an array antenna system according to one embodiment of the invention.

An embodiment of the present invention will be explained below with reference to the drawings. FIG. 2 is a diagram showing an overall structure of an array antenna system according to one embodiment of the invention when it is applied as a radar apparatus.

This array antenna system 10 has a plurality of transmit/receive modules 11, two element antennas 12*a* and 12*b* connected respectively to each transmit/receive module 11, a transmitting signal distributing section 13 connected to a transmitting path of the transmit/receive module 11, a transmitting signal generating section 14 that supplies transmitting signals to the transmitting signal distributing section 13, a received signal synthesizing section 15 for synthesizing received signals obtained through a receiving path of the transmit/receive module 11, a received signal processing section 16 for performing image processing and others on the received signal synthesized in the received signal synthesizing section 15, an image displaying section 17 for displaying the signal processed in the received signal processing section 16 and a transmitting/receiving phase control section 18 for controlling phase shift amounts of a transmitting phase shifter and a receiving phase shifter described later within each transmit/receive module 11.

The transmit/receive module 11 has one transmitting path and two receiving paths. Specifically, the transmit/receive module 11 has a three-terminal circulator 21*a* whose terminal A is connected to the element antenna 12*a*, a receiving amplifier 22*a* whose input terminal is connected to a terminal B of the three-terminal circulator 21*a*, a receiving phase shifter 23*a* whose input terminal is connected with an output terminal of the receiving amplifier 22*a* and whose output terminal is connected with the received signal synthesizing section 15 described above, a three-terminal circulator 21*b* whose terminal A is connected to the element antenna 12*b*, a receiving amplifier 22*b* whose input terminal is connected to a terminal C of the three-terminal circulator 21*b*, a receiving phase shifter 23*b* whose input terminal is connected with an output terminal of the receiving amplifier 22*b* and whose output terminal is connected with the received signal synthesizing section 15 described above, a transmitting phase shifter 24 that is connected with an output terminal of the transmitting signal distributing section 13, a transmitting amplifier 25 whose input terminal is connected with an output terminal of the transmitting phase shifter 24 and a bi-distributor 26 whose input terminal is connected with an input terminal of the transmitting amplifier 25, whose one output terminal is connected with a terminal C of the three-terminal circulator 21*a* and whose other output terminal is connected with a terminal B of the three-terminal circulator 21*b*.

The receiving amplifiers 22*a* and 22*b* and the transmitting amplifier 25 are composed of Monolithic Microwave Integrated Circuits (MMIC) for example. A Y-shaped distributor composed of a planar microwave IC proposed by Wilkinson (here, this distributor will be also referred to as the Wilkinson-type distributor) may be used for example as the bi-distributor 26.

Figure 3:
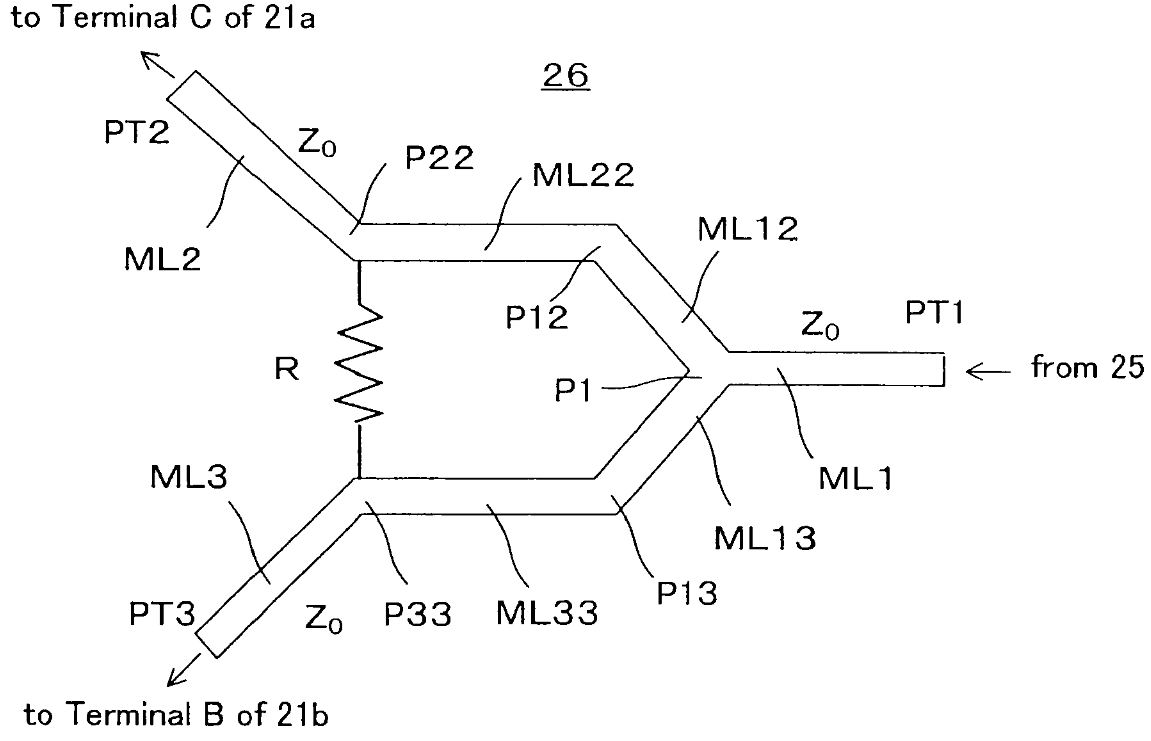
FIG. 3 shows an exemplary structure of a bi-distributor 26 in a transmit/receive module 11 of the embodiment shown in FIG. 2.

FIG. 3 shows a shape of a micro-strip line of one exemplary Y-shaped distributor used in the transmit/receive module 11 of the embodiment described above. As shown in FIG. 3, a micro-strip line ML1 whose one end is a terminal PT1 is divided at point P1 into micro-strip lines ML12 and ML13. The micro-strip lines are then bent at points P12 and P13 as micro-strip lines ML22 and ML33 that are parallel to each other and are bent outwardly at next points P22 and P33 to be formed as micro-strip lines ML2 and ML3. Other ends of the micro-strip lines ML2 and ML3 are formed as terminals PT2 and PT3, respectively. A resistance R is then connected between the points P22 and P33.

When impedances of the three terminals PT1, PT2 and PT3 are $Z_0$ and are matched, a signal input from the terminal PT1 is output to the terminals PT2 and PT3 by being divided with a predetermined ratio, e.g., equally. That is, an output from the terminal PT2 is input to the terminal C of the three-terminal circulator 21*a* and is output from the terminal A of this circulator 21*a*. Meanwhile, an output from the terminal PT3 is input to the terminal B of the three-terminal circulator 21*b* and is output from the terminal A of this circulator 21*b*.

It is noted that if there is an input from the terminal PT2, a part thereof is output from the terminal PT1 and the resistance R absorbs the rest and if there is an input from the terminal PT3, a part thereof is output from the terminal PT1 and the rest is absorbed by the resistance R. Thus, the input from the terminal PT2 does not appear at the terminal PT3 or the input from the terminal PT3 does not appear at the terminal PT2. Accordingly, isolation between the terminals PT2 and PT3 is kept well.

Still more, because the terminals PT2 and PT3 are connected respectively to the three-terminal circulators 21*a* and 21*b* in the present embodiment, substantially there is no input from the three-terminal circulators 21*a* and 21*b* to the terminals PT2 and PT3.

The three-terminal circulator 21*a* has an electrical characteristic of sending a signal input from the terminal A to the terminal B, of sending a signal input from the terminal B to the terminal C and of sending a signal input from the terminal C to the terminal A. The three-terminal circulator 21*b* also has an electrical characteristic of sending a signal input from the terminal A to the terminal C, of sending a signal input from the terminal C to the terminal B and of sending a signal input from the terminal B to the terminal A. Accordingly, the transmitting signal distributed in the bi-distributor 26 and input to the terminal C of the three-terminal circulator 21*a* is supplied to the element antenna 12*a* connected to the terminal A of the three-terminal circulator 21*a* and is transmitted. Meanwhile, the transmitting signal supplied from the bi-distributor 26 to the terminal B of the three-terminal circulator 21*b* is supplied to the element antenna 12*b* connected to the terminal A and is transmitted.

Still more, a signal received by the element antenna 12*a* is supplied to the terminal A of the three-terminal circulator 21*a* and is output from the terminal B to be supplied to the receiving amplifier 22*a*. A signal received by the element antenna 12*b* is supplied to the terminal A of the three-terminal circulator 21*b* and is output from the terminal C to be supplied to the receiving amplifier 22*b*. The three-terminal circulators 21*a* and 21*b* having such characteristics that rotation directions of input signals are reversed from each other may be obtained just by changing polarities of magnets provided upper and lower parts of the circulators while keeping components other than the magnets the same.

It is noted although FIG. 2 shows the system having only the five transmit/receive modules 11 in a row in order to facilitate understanding thereof, an actual system is normally provided with many more transmit/receive modules arrayed even two-dimensionally.

Next, operations of the array antenna system 10 of the embodiment will be explained. A transmitting signal, e.g., a pulse signal, generated by the transmitting signal generating section 14 is supplied to the transmitting signal distributing section 13 and is sent from the transmitting signal distributing section 13 to the transmitting phase shifter 24 of each transmit/receive module 11. The transmitting phase shifter 24 applies a predetermined phase shift amount (delay amount) to the transmitting signal based on a phase control signal sent from the transmitting/receiving phase control section 18 and sends the signal to the transmitting amplifier 25 to amplify the same. The transmitting signal provided with the predetermined phase shift amount and amplified is supplied to the bi-distributor 26 to be distributed substantially equally to the terminals C and B of the three-terminal circulators 21*a* and 21*b*.

The transmitting signal supplied from the bi-distributor 26 to the terminal C of the three-terminal circulator 21*a* is output out of the terminal A to be transmitted from the element antenna 12*a*. Meanwhile, the transmitting signal supplied from the bi-distributor 26 to the terminal B of the three-terminal circulator 21*b* is output out of the terminal A and is transmitted from the element antenna 12*b*.

The transmitting signal transmitted from the element antenna 12*a* has the same phase with the transmitting signal transmitted from the element antenna 12*b*. While different phases are applied to the transmitting signals between neighboring transmit/receive modules in electronically scanning the transmitting signals in general, the transmitting signals having the same phase are transmitted from the antennas 12*a* and 12*b* connected to one transmit/receive module. That is, the received signals having the equal phase are transmitted from the antennas 12*a* and 12*b* in a direction perpendicular to the array of those antennas.

Figure 4A:
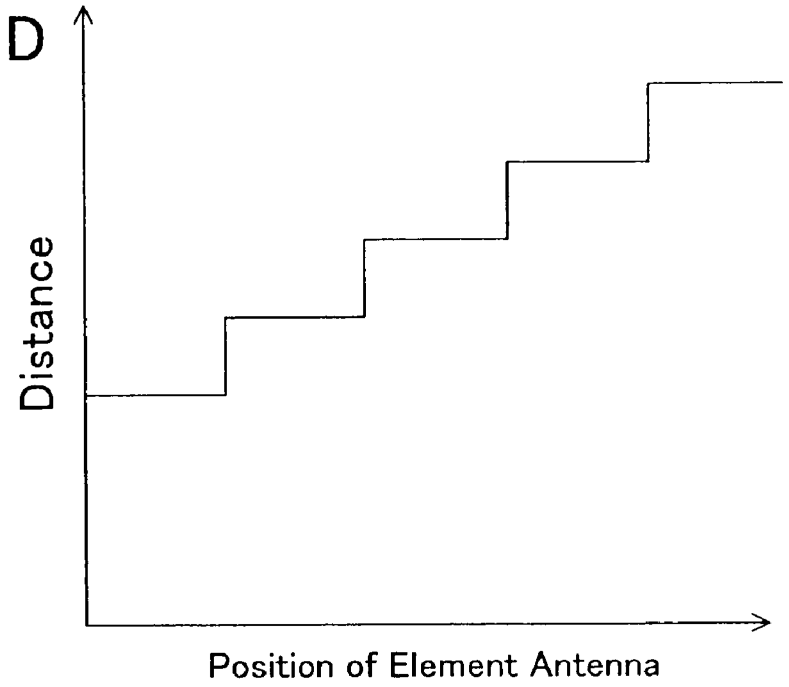
FIG. 4A shows a phase relationship during transmission in element antennas of the array antenna system of the embodiment.

Accordingly, the transmitting signal has a step-like phase plane as shown in FIG. 4A as a whole. FIG. 4A shows a distance D by an axis of ordinate and each position of the element antenna by an axis of abscissas. Accordingly, it signifies the same phase plane of the transmitting signals transmitted from the respective element antennas. It is noted that the phase plane of the radio transmitted from the element antenna is shown extremely clearly in FIG. 4A. Accordingly, the step-like portion of the boundary between the phase plane of the radio waves transmitted with equal phase from the pair of antennas and that of the radio waves transmitted with equal phase from a neighboring pair of element antennas is conspicuous. However, because a number of the transmit/receive modules is actually so large as several tens or more, the stepped-like portions give substantially no adverse effect to the transmitting characteristics.

The respective antennas 12*a* and 12*b* receive reflected waves of the radar transmitting signals transmitted as described above and returned from each object. The radar-receiving signal received by each element antenna 12*a* is input to the terminal A of the three-terminal circulator 21*a*. Then, the radar-receiving signal is output out of the terminal B of the three-terminal circulator 21*a* and is input to an input terminal of the receiving amplifier 22*a* to be amplified.

The receiving phase shifter 23*a* applies a phase shift amount controlled by the transmitting/receiving phase control section 18 to the received signal amplified by the receiving amplifier 22*a* and supplies the signal to the received signal synthesizing section 15.

Meanwhile, the radar-receiving signal received by each element antenna 12*b* is input to the terminal A of the three-terminal circulator 21*b*. Then, the radar-receiving signal is output out of the terminal C of the three-terminal circulator 21*b* and is input to an input terminal of the receiving amplifier 22*b* to be amplified.

The receiving phase shifter 23*b* applies a phase shift amount controlled by the transmitting/receiving phase control section 18 to the received signal amplified by the receiving amplifier 22*b* and supplies the signal to the received signal synthesizing section 15.

Figure 4B:
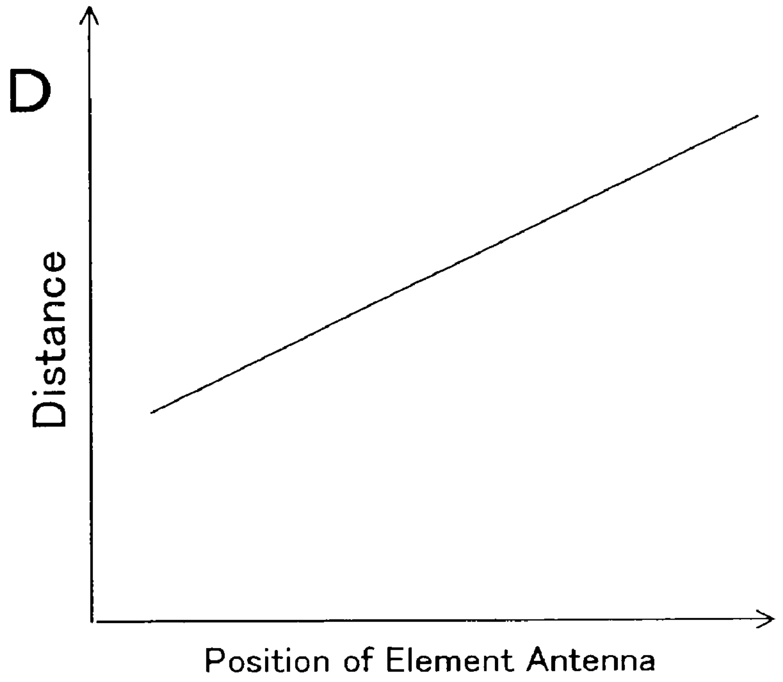
FIG. 4B shows a phase relationship during receiving in the element antennas of the array antenna system of the embodiment.

The receiving phase shifter 23*a* corresponding to the element antenna 12*a* is different from the receiving phase shifter 23*b* corresponding to the element antenna 12*b* in the case of the receiving. Accordingly, the transmitting/receiving phase control section 18 can apply different phase shift amounts to the both receiving phase shifters 23*a* and 23*b* within the same transmit/receive module 11, so that the same phase plane in receiving has substantially a linear characteristic as shown in FIG. 4B. FIG. 4B shows a distance D by an axis of ordinate and each position of the element antenna by an axis of abscissas.

The received signal processing section 16 performs the image processing on the received signal synthesized by the received signal synthesizing section 15 to display on a radar display screen of the image display section 17.

Although the array antenna system having the one-dimensionally disposed element antennas and the five transmit/receive modules has been explained in the embodiment described above, the present invention is applicable also to an array antenna system in which the element antennas are two-dimensionally disposed and having much more element antennas and transmit/receive modules.

According to the embodiment described above, although each transmit/receive module of the array antenna system of the invention requires the distributor and one high-output transmitting amplifier as compared to that of the prior art antenna system, each transmit/receive module requires only one transmitting path. That is, it becomes possible to eliminate one each of the transmitting amplifiers and the transmitting phase shifters.

By the way, it is conceivable to construct the following prior art antenna system. That is, transmit/receive modules (e.g., about ten modules) composed of the same unitary units are disposed at a center part of the antenna system an transmit/receive modules whose one unitary unit is composed of only a receiving path are disposed at both ends (e.g., about 15 modules each) of the apparatus.

An advantage of the embodiment of the invention will be specifically described as compared to this antenna system. The prior art antenna system described above is composed of the 20 transmit/receive two-channel modules at the center part and of the array antenna system 30 transmit/receive one-channel modules at the both ends.

In contrary to that, if the apparatus of the embodiment of the invention has 40 transmitting/receiving channels for example, i.e., 40 transmitting channels equally with 40 receiving channels, a transmitting antenna gain improves by about 3 dB. Because the number of the transmitting element antennas decreases from 50 to 40, transmitting electric power drops by about 1 dB. As a result, the transmitting antenna gain improves by about 2 dB. Still more, an interval (interval where phase control can be made) in a transmitting elevation (EL) direction is doubled as compared to the case of the prior art apparatus described above and a transmitting EL scan range may be run over by ±4°.

According to the embodiment described above, the invention has an advantage of keeping the characteristics of the apparatus without dropping the transmitting antenna gain. Still more, because the invention allows the transmitting amplifier and the transmitting phase shifter of the transmitting path to be cut, it allows the transmit/receive module to be downsized and the cost of the transmit/receive module to be lowered. Consequently, the invention has such merits that it allows the array antenna system to be downsized and the cost of the apparatus to be lowered.

Although the Wilkinson based Y-shaped bi-distributor has been used in the embodiment described above, distributors other than the Y-shaped distributor may be used. The distributor is not also limited to the bi-distributor.

Still more, although the case of using the Wilkinson-type distributor as the bi-distributor has been explained in the embodiment described above, the distributor is not limited to the Wilkinson-type and a distributor through which signals pass with substantially equal phase may be used as the bi-distributor of the invention.

Further, the case of using the circulator as two signal switches has been explained in the embodiment described above. However, two circulators that turn in opposite directions, i.e., that output signals to ports in directions opposite to certain ports to which the signals are input.

Although the three-terminal circulator has been used to switch the transmitting and receiving paths in the embodiment described above, the invention is not limited to that having the three terminals. The invention is not also limited to the circulator and may use a signal switch that automatically switches transmitting and receiving paths.

Still more, the path of the transmitting phase shifter 24, the transmitting amplifier 25 and the bi-distributor 26, i.e., the part of the transmitting path and the path of the receiving amplifier 22*a*, the receiving phase shifter 23*a* or of the receiving amplifier 22*b* and the receiving phase shifter 23*b*, i.e., the part of the receiving path, have formed the separate paths in the embodiment described above as shown in FIG. 2.

However, the invention may be arranged so as to overlap the part of the transmitting path with the part of the receiving path and to switch the paths temporally. That is, the transmitting phase shifter 24 may be used also as the receiving phase shifter 23*a* or the receiving phase shifter 23*b* so as to switch during transmission and receiving by means of a switch. Although such arrangement requires the switch, the number of the phase shifters, e.g., three in the case of the transmit/receive module of the embodiment shown in FIG. 2, may be reduced further to two.

Accordingly, the invention is not limited to the embodiment described above and may be carried out by modifying variously. Those modifications are also included in the scope of the invention so long as they are included in the technological thought of the invention.

What is claimed is:

1. An array antenna system comprising:
- a plurality of transmit/receive modules including one transmitting path and first and second receiving paths, each transmit/receive module comprising:
  - a first element antenna;
  - a second element antenna;
  - a first amplifier connected to the first element antenna, amplifying signals received by the first element antenna on the first receiving path;
  - a second amplifier connected to the second element antenna, amplifying signals received by the second element antenna on the second receiving path;
  - a first phase shifter on the first receiving path, configured to apply a predetermined phase shift amount to signals amplified by the first receiving amplifier;
  - a second phase shifter on the second receiving path, configured to apply a predetermined phase shift amount to signals amplified by the second receiving amplifier;
  - a third phase shifter configured to apply a predetermined phase shift amount to transmitting signals on the transmitting path; and
  - a third amplifier connected to the first element antenna and the second element antenna, configured to amplify signals applied phase shift by the third phase shifter on the transmitting path, the signals amplified by third amplifier being commonly provided to the first element antenna and the second element antenna.

2. The array antenna system according to claim 1, further comprising:
- a first signal switch connecting the first element antenna to an input terminal of the first amplifier and to an output terminal of the third phase shifter; and
- a second signal switch connecting the first element antenna to an input terminal of the first amplifier and to an output terminal of the third phase shifter.

3. The array antenna according to claim 2, wherein the first and second signal switches are circulators whose directions for rotating the signals are opposite from each other.

4. The array antenna system according to claim 3, further comprising one distributor configured to distribute the signals amplified by the third amplifier to the first signal switch and the second signal switch.

5. The array antenna system according to claim 4, wherein the distributor is a two-output distributor whose passing phases are substantially equal.

6. The array antenna system according to claim 5, wherein the distributor is a Wilkinson-type distributor.

7. A transmit/receive module including one transmitting path and first and second receiving paths, the transmit/receive module comprising:
- a first element antenna;
- a second element antenna;
- a first amplifier connected to the first element antenna, amplifying signals received by the first element antenna on the first receiving path;
- a second amplifier connected to the second element antenna, amplifying signals received by the second element antenna on the second receiving path;
- a first phase shifter on the first receiving path, configured to apply a predetermined phase shift amount to signals amplified by the first receiving amplifier;
- a second phase shifter on the second receiving path, configured to apply a predetermined phase shift amount to signals amplified by the second receiving amplifier;
- a third phase shifter configured to apply a predetermined phase shift amount to transmitting signals on the transmitting path; and
- a third amplifier connected to the first element antenna and the second element antenna, configured to amplify signals applied phase shift by the third phase shifter on the transmitting path, the signals amplified by third amplifier being commonly provided to the first element antenna and the second element antenna.

8. The transmit/receive module according to claim 7, further comprising:

a first signal switch connecting the first element antenna to an input terminal of the first amplifier and to an output terminal of the third phase shifter; and a second signal switch connecting the first element antenna to an input terminal of the first amplifier and to an output terminal of the third phase shifter.

9. The transmit/receive module according to claim 8, wherein the first and second signal switches are circulators whose directions for rotating the signals are opposite from each other.

10. The transmit/receive module according to claim 9, further comprising one distributor configured to distribute the signals amplified by the third amplifier to the first signal switch and the second signal switch.

11. The transmit/receive module according to claim 10, wherein the distributor is a two-output distributor whose passing phases are substantially equal.

12. The transmit/receive module according to claim 11, wherein the distributor is a Wilkinson-type distributor.

* * * * *